(12) United States Patent
Mangia et al.

(10) Patent No.: US 9,174,405 B2
(45) Date of Patent: Nov. 3, 2015

(54) TREAD STRIP CURING STATION

(71) Applicant: BRIDGESTONE CORPORATION, Chuo-ku, Tokyo (JP)

(72) Inventors: Massimo Mangia, Basiglio (IT); Luca Spiri, Roma (IT); Renata Erica Morace, Napoli (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/385,399

(22) PCT Filed: Mar. 15, 2013

(86) PCT No.: PCT/IB2013/052103

§ 371 (c)(1),
(2) Date: Sep. 15, 2014

(87) PCT Pub. No.: WO2013/136313

PCT Pub. Date: Sep. 19, 2013

(65) Prior Publication Data

US 2015/0072034 A1    Mar. 12, 2015

(30) Foreign Application Priority Data

Mar. 16, 2012 (IT) .............................. TO2012A0232

(51) Int. Cl.

| | |
|---|---|
| *B29C 33/44* | (2006.01) |
| *B29D 30/06* | (2006.01) |
| *B29C 37/00* | (2006.01) |
| B29L 30/00 | (2006.01) |
| B29C 35/02 | (2006.01) |

(52) U.S. Cl.
CPC ................ *B29D 30/06* (2013.01); *B29C 33/44* (2013.01); *B29C 37/0007* (2013.01); *B29D 30/0603* (2013.01); *B29D 30/0662* (2013.01); B29C 33/442 (2013.01); B29C 35/02 (2013.01); B29L 2030/002 (2013.01)

(58) Field of Classification Search
CPC ...... B29C 33/44; B29C 33/442; B29C 35/02; B29C 37/0007; B29D 30/06; B29D 30/0662
See application file for complete search history.

(56) References Cited

U.S. PATENT DOCUMENTS

| | | | |
|---|---|---|---|
| 7,186,103 B2 * | 3/2007 | Menard | ........................ 425/28.1 |
| 2004/0197432 A1 | 10/2004 | Menard | |
| 2013/0011507 A1 | 1/2013 | Itani et al. | |

FOREIGN PATENT DOCUMENTS

| | | |
|---|---|---|
| EP | 0 505 910 A1 | 9/1992 |
| JP | 2002-120301 A | 4/2002 |
| JP | 2002-192581 A | 7/2002 |
| WO | 2011/114855 A1 | 9/2011 |

OTHER PUBLICATIONS

International Search Report for PCT/IB2013/052103 dated Jun. 24, 2013 [PCT/ISA/210].

* cited by examiner

*Primary Examiner* — James Mackey
(74) *Attorney, Agent, or Firm* — Sughrue Mion, PLLC

(57) ABSTRACT

A curing station for curing a tread strip, having a flat curing mold; a gripper which grips a portion of the cured tread strip inside the curing mold; an actuating device which, at the end of the curing process, moves the gripper to gradually extract the cured tread strip from the curing mold; and a guide device which, as the cured tread strip is extracted, is positioned over the curing mold, and has a main roller, about which the extracted part of the cured tread strip winds, and a secondary roller smaller in diameter than, and positioned parallel to and alongside, the main roller.

10 Claims, 6 Drawing Sheets

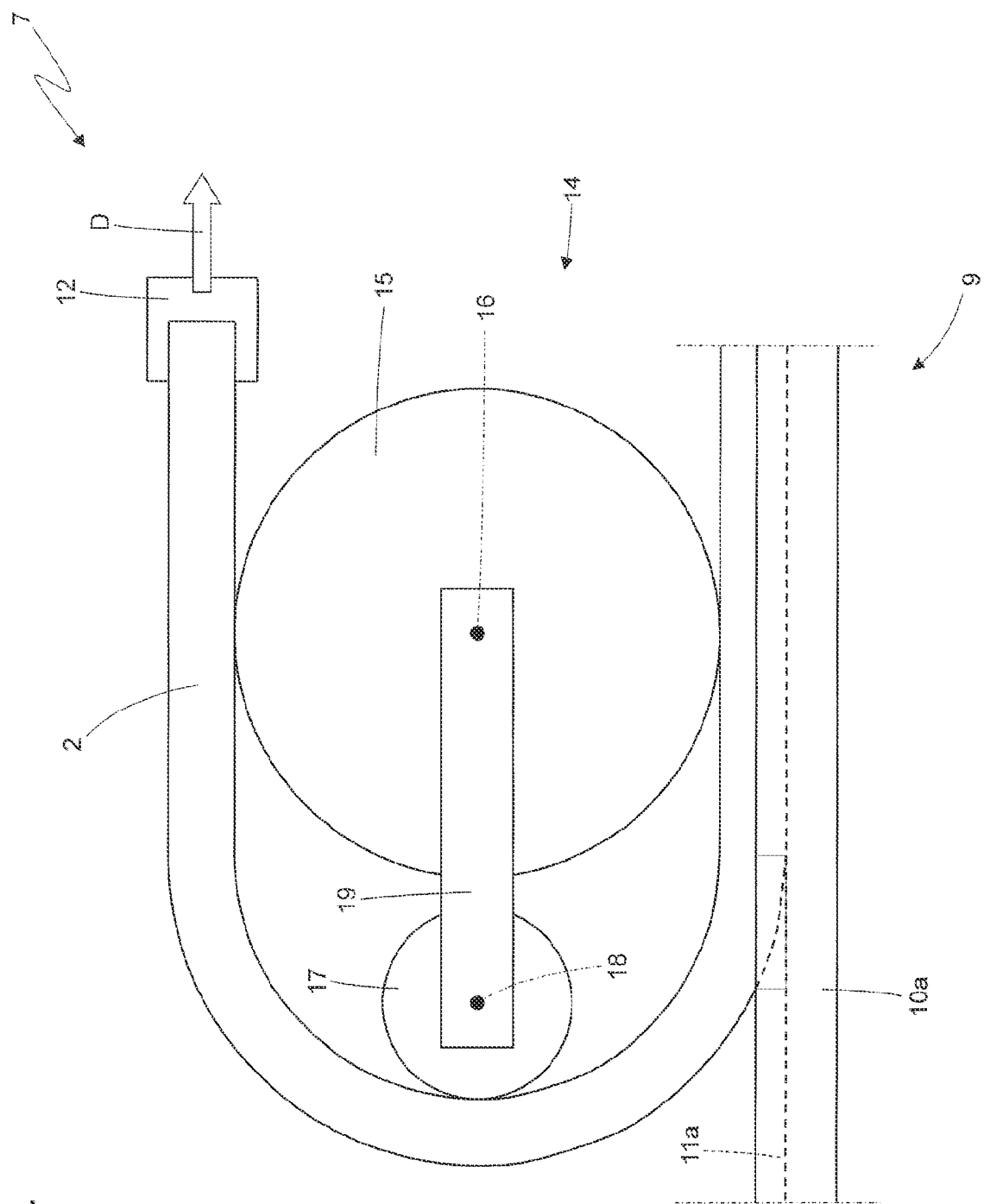

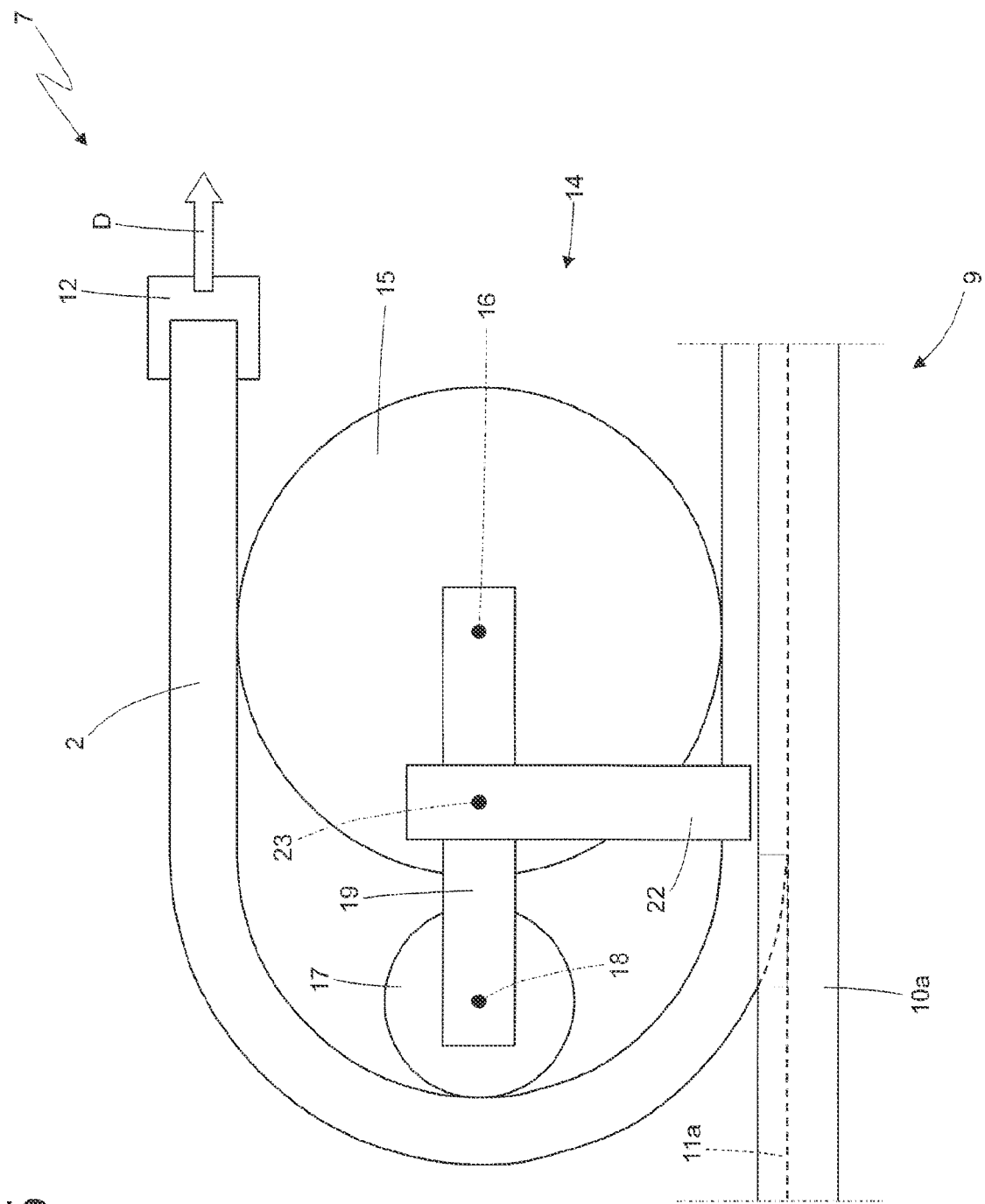

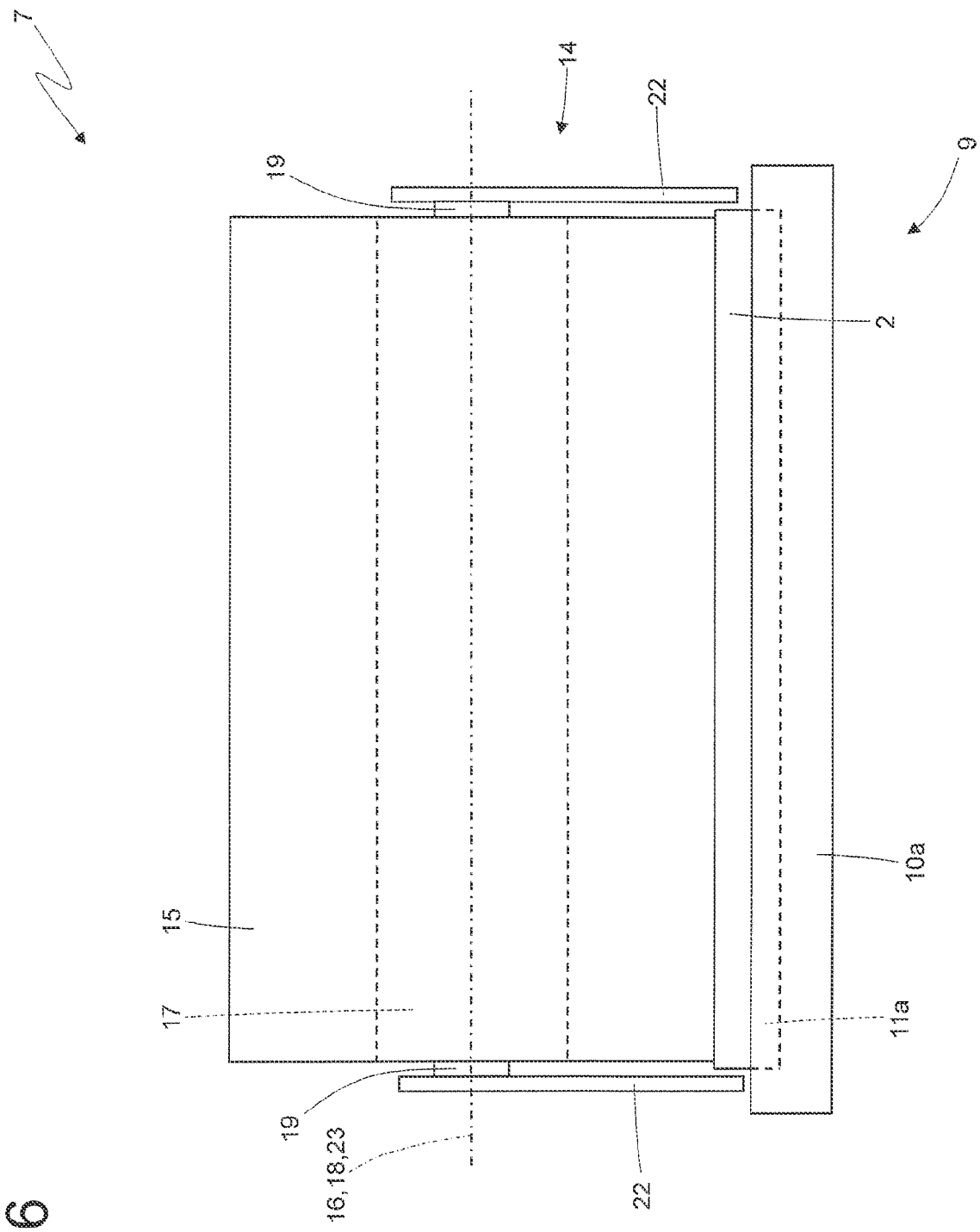

TREAD STRIP CURING STATION

CROSS REFERENCE TO RELATED APPLICATIONS

This application is a National Stage of International Application No. PCT/IB2013/052103, filed on Mar. 15, 2013, which claims priority from Italian Patent Application No. TO2012A000232, filed on Mar. 16, 2012, the contents of all of which are incorporated herein by reference in their entirety.

TECHNICAL FIELD

The present invention relates to a tread strip curing station.

BACKGROUND ART

Cold-retreading a tyre comprises removing the worn tread from the tyre, and applying a new, cured tread to the tyre carcass. Applying the new, cured tread to the carcass comprises winding a green-rubber cushion and a so-called PCT (Pre-Cured Tread) strip around the carcass; and the carcass, wound inside the cushion and the pre-cured tread strip, is then inserted inside an autoclave and cured further to grip the tread firmly to the carcass by means of the binding action of the cushion.

One example of a pre-cured tread strip, ready for application to a tyre carcass, is described in U.S. Pat. No. 5,277,727A1. One example of a cold tyre retreading station employing the above method is described in U.S. Pat. No. 6,368,439B1.

Constructing the pre-cured tread strip comprises extruding a green-rubber compound into a continuous green tread strip, which is then cut crosswise into a succession of green tread strips of given length. Each green tread strip is inserted inside a flat curing mold, in which it is cured; and, at the end of the curing process, the cured tread strip must be extracted from the curing mold by detaching the cured tread strip from the parts of the curing mold defining a negative of the tread pattern. The flat curing mold is normally equipped with a gripper, which is initially integrated in the curing mold, engages one end of the cured tread strip, and is lifted up and drawn along by an actuating device to gradually extract the cured tread strip from the curing mold.

Two examples of extracting a cured tread strip from a flat curing mold are described in Patent Applications US2004197432A1 and US2011148001A1.

As it is extracted from the flat curing mold, the cured tread strip bends roughly 180° with a small bend radius in the extraction area, thus subjecting the rubber to severe mechanical stress concentrated in the extraction area, and which may result in the formation of cracks (i.e. deep, narrow fissures) normally originating at the grooves in the tread pattern. In which case, the cured tread strip must obviously be scrapped.

One proposed solution, to reduce mechanical stress concentrated in the extraction area, is to employ a guide roller located over the curing mold, and about which the extracted part of the cured tread strip winds. The guide roller is mounted idly to rotate freely about its central axis, and also to move freely in a direction parallel to the curing mold. The guide roller forces the cured tread strip to bend 180° with a bend radius no smaller than the radius of the guide roller itself. So, a guide roller with a large enough radius prevents the cured tread strip from bending 180° with too small a bend radius, and so prevents severe mechanical stress, capable of forming cracks, from concentrating in the cured tread strip in the extraction area. Relatively large-radius guide rollers, however, have been found to impede extraction of the cured tread strip from the flat curing mold, by forming an overhead obstacle, with which the cured tread strip underneath collides in the extraction area.

DESCRIPTION OF THE INVENTION

It is an object of the present invention to provide a tread strip curing station designed to eliminate the above drawbacks, and which at the same time is cheap and easy to implement.

According to the present invention, there is provided a tread strip curing station as claimed in the accompanying Claims.

BRIEF DESCRIPTION OF THE DRAWINGS

A number of non-limiting embodiments of the present invention will be described by way of example with reference to the attached drawings, in which:

FIG. 4 shows a larger-scale, schematic front view of the FIG. 1 curing station when extracting the cured tread strip from the curing mold;

FIG. 5 shows a larger-scale, schematic front view of the FIG. 1 curing station when extracting the cured tread strip from the curing mold in accordance with an alternative embodiment;

FIG. 6 shows a schematic side view of the FIG. 5 curing station when extracting the cured tread strip from the curing mold.

PREFERRED EMBODIMENTS OF THE INVENTION

Figure 1:
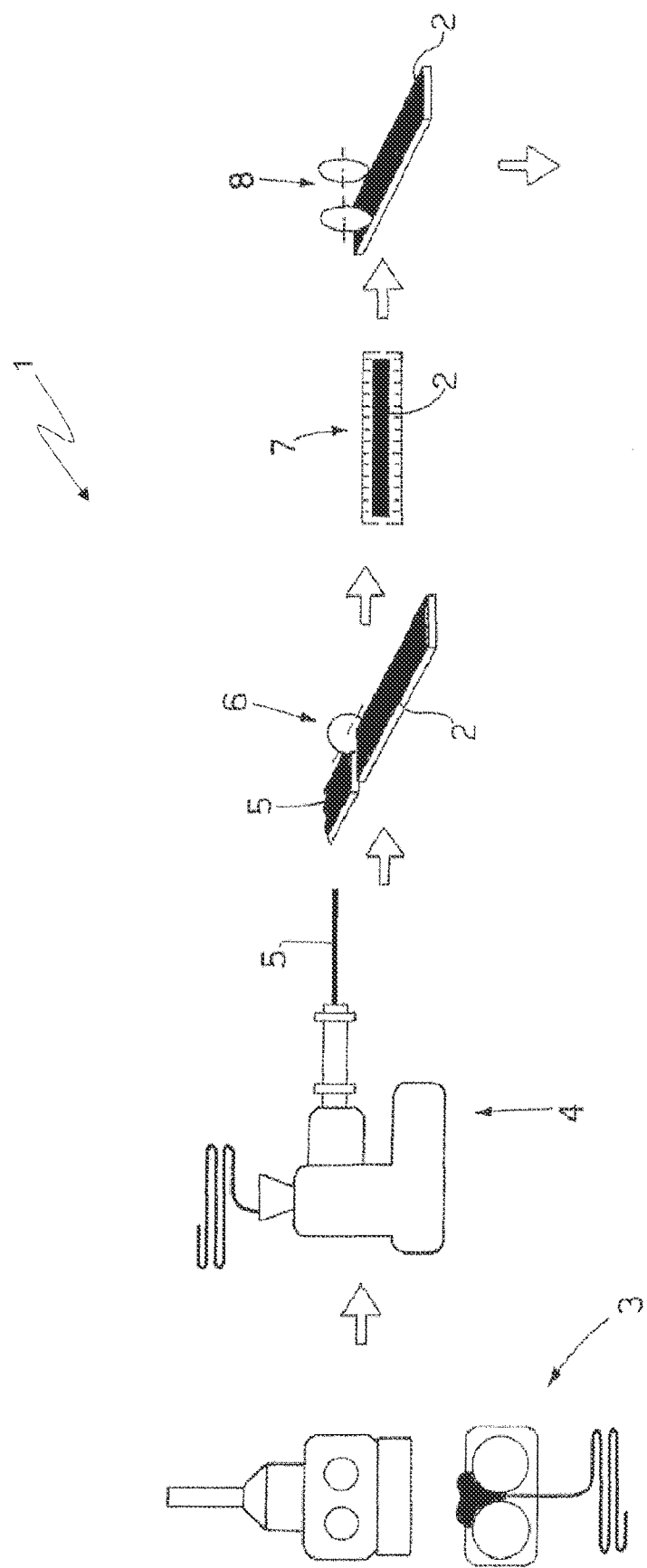
FIG. 1 shows a schematic of a system for producing a pre-cured tread strip.

Number 1 in FIG. 1 indicates as a whole a system for producing tread strips 2 for use in cold-retreading tyres.

System 1 comprises a mixing device 3, where a green-rubber compound is formed and fed to an extruding device 4, which extrudes the green-rubber compound into a continuous green tread strip 5. Downstream from extruding device 4, a cutting device 6 cuts the continuous green tread strip 5 into a succession of green tread strips 2 of given length. Downstream from cutting device 6, a curing station 7 cures green tread strips 2 to form so-called PCT (Pre-Cured Tread) strips 2. A trimming device 8 is preferably provided downstream from curing station 7, to remove curing flash from each cured tread strip 2.

Figure 2:
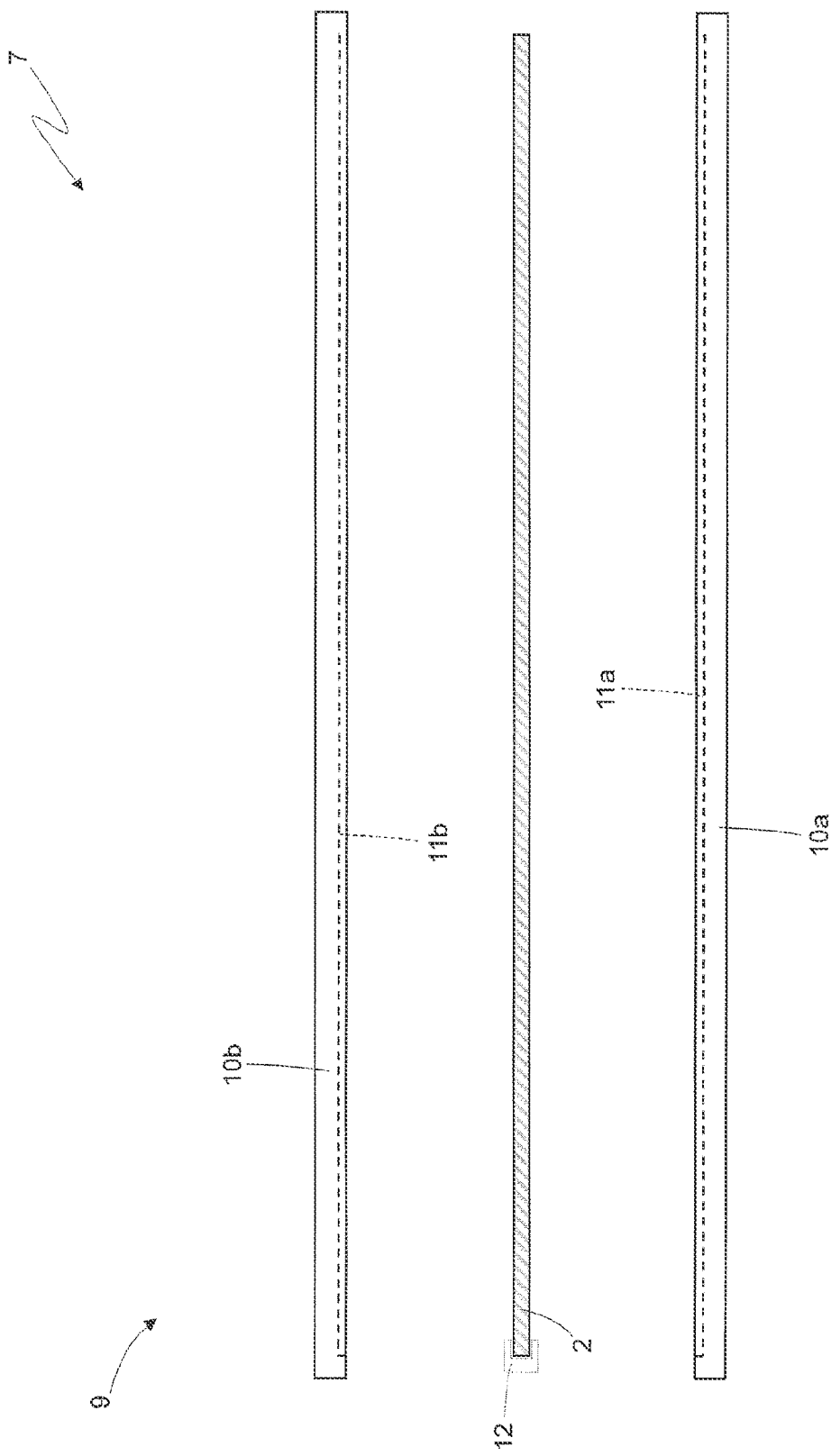
FIG. 2 shows a schematic, exploded front view of a curing mold of a curing station of the FIG. 1 system.

As shown in FIG. 2, curing station 7 comprises a flat, parallelepiped-shaped curing mold 9 comprising two shells 10a, 10b, which are joined to close curing mold 9 to perform the curing process, and are parted to open curing mold 9 to insert a green tread strip 2 into, or extract a cured tread strip 2 from, curing mold 9.

A cavity 11, reproducing a negative of the desired final shape of tread strip 2, is defined inside curing mold 9, i.e. between shells 10a and 10b, houses tread strip 2 during the curing process, and is divided into two half-cavities 11a and 11b formed in bottom shell 10a and top shell 10b respectively.

Cavity 11a in bottom shell 10a of curing mold 9 reproduces a negative of the tread pattern, while cavity 11b in top shell 10b is substantially smooth, i.e. has no raised parts. At the end of the curing process, curing mold 9 is opened by lifting top shell 10b vertically. Top shell 10b is easy to lift vertically, on account of cavity 11b in top shell 10b being substantially smooth, and the cured tread strip 2 therefore only adhering slightly to shell 10b. Once curing mold 9 is opened by lifting top shell 10b vertically, extraction of the cured tread strip 2 must be completed by extracting cured tread strip 2 from bottom shell 10a.

Figure 3:
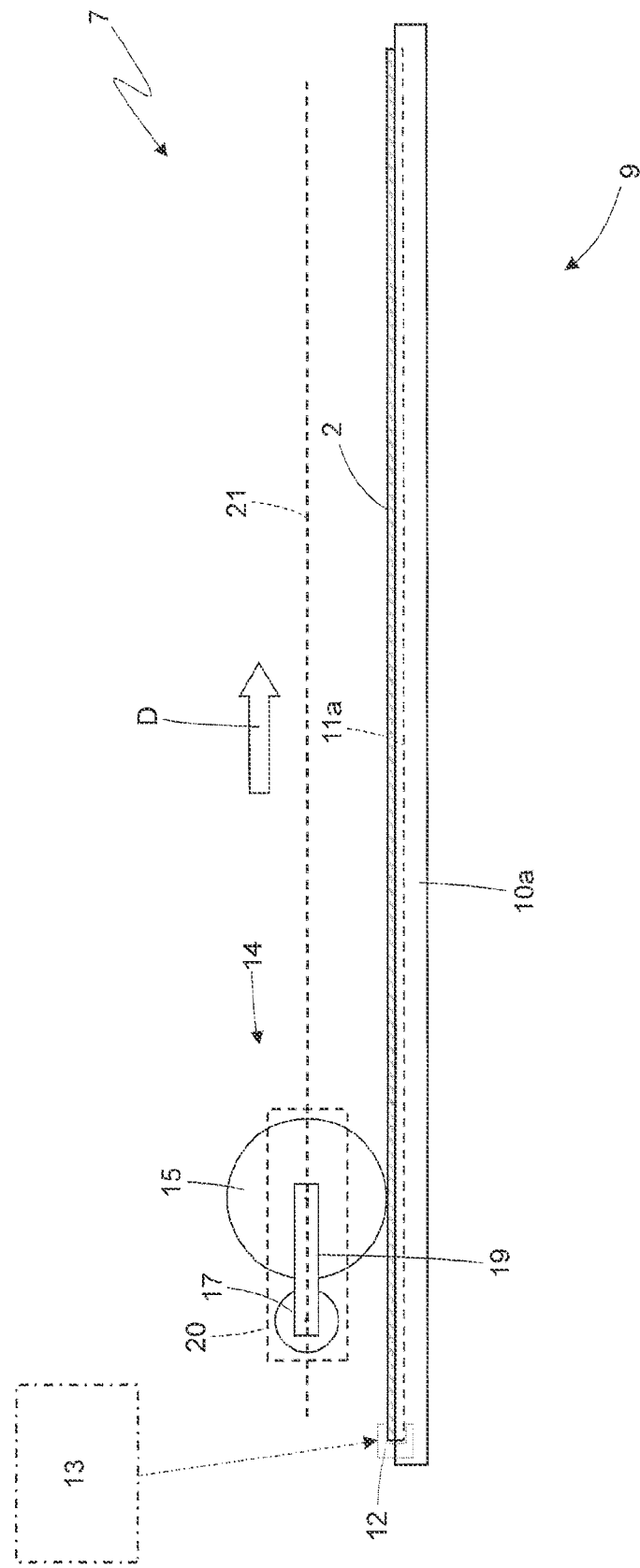
FIG. 3 shows a schematic front view of the FIG. 1 curing station when commencing extraction of a cured tread strip from the curing mold.

As shown in FIG. 3, curing station 7 comprises a gripper 12, which grips a portion of the cured tread strip 2 inside curing mold 9, and more specifically inside bottom shell 10a of curing mold 9. Initially, gripper 12 is preferably integrated in curing mold 9 to engage one end of tread strip 2 from the outset (i.e. as the green tread strip 2 is inserted inside curing mold 9). When curing mold 9 is opened by lifting top shell 10b vertically at the end of the curing process, an actuating device 13 moves gripper 12 to extract the cured tread strip 2 gradually from curing mold 9 (i.e. from bottom shell 10a of curing mold 9). More specifically, actuating device 13 first moves gripper 12 (gripping and retaining one end of cured tread strip 2) vertically, and then in a horizontal extraction direction D parallel to curing mold 9, to extract cured tread strip 2 gradually from curing mold 9.

As shown more clearly in FIG. 4, curing station 7 comprises a guide device 14, which, as the cured tread strip 2 is extracted, is positioned over curing mold 9, and comprises a main roller 15 about which the extracted part of cured tread strip 2 winds. In other words, main roller 15 forces the cured tread strip 2 to bend 180° with a bend radius no smaller than the radius of main roller 15. Main roller 15 is mounted to rotate idly (i.e. freely) about a horizontal central axis of rotation 16 perpendicular to extraction direction D. Guide device 14 also comprises a secondary roller 17, which is smaller in diameter than main roller 15, is positioned parallel to and alongside main roller 15, and is located upstream from main roller 15 in the cured-tread strip extraction direction D in which actuating device 13 moves gripper 12. Secondary roller 17 is also mounted to rotate idly (i.e. freely) about a horizontal central axis of rotation 18 parallel to axis of rotation and therefore also perpendicular to extraction direction D.

The diameter of main roller 15 is preferably at least twice the diameter of secondary roller 17 (in the embodiment shown in the drawings, the diameter of main roller 15 is roughly 2.5 times the diameter of secondary roller 17).

Guide device 14 comprises two supporting brackets 19, which (as shown more clearly in FIG. 6) are located on opposite sides of, and support for rotation, rollers 15 and 17, which are hinged to brackets 19. Both rollers 15, 17 are fitted idly to supporting brackets 19 to rotate freely about respective axes of rotation 16, 18 perpendicular to the cured-tread strip extraction direction D in which actuating device 13 moves gripper 12.

As shown in FIG. 3, the two supporting brackets 19 are fitted to a slide 20 in turn fitted to a guide 21, parallel to the cured-tread strip extraction direction D, to run in extraction direction D. Slide 20 is preferably fitted idly to guide 21 to run freely in extraction direction D, so rollers 15 and 17 are moved in extraction direction D by the extracted portion of cured tread strip 2 winding about rollers 15 and 17.

In the FIGS. 5 and 6 embodiment, guide device 14 comprises two locators 22 located on opposite sides of guide device 14 to define the sides of a channel in which the extracted part of cured tread strip 2 is confined. In other words, locators 22 provide for positioning the extracted part of cured tread strip 2 correctly with respect to guide device 14, by laterally retaining and preventing undesired lateral movement of the extracted part of cured tread strip 2. Each locator 22 is fixed to a respective supporting bracket 19, and is preferably hinged idly to respective supporting bracket 19 to rotate freely about an axis of rotation 23 parallel to axes of rotation 16, 18 of rollers 15, 17.

Curing station 7 described has numerous advantages.

Firstly, secondary roller 17 enables the use of a large-diameter main roller 15 (to minimize mechanical stress concentration in the cured tread strip 2 in the extraction area) with no risk of the main roller 15 forming an overhead obstacle impeding extraction of cured tread strip 2 from bottom shell 10a of curing mold (i.e. an overhead obstacle with which the cured tread strip 2 underneath collides in the extraction area).

Main roller 15 forces the cured tread strip 2 to bend 180° with a bend radius no smaller than the radius of main roller 15 itself. So, a main roller 15 with a large enough radius prevents the cured tread strip 2 from bending 180° with too small a bend radius, and so prevents severe mechanical stress, capable of forming cracks, from concentrating in the cured tread strip 2 in the extraction area. And secondary roller 17 prevents main roller 15 from forming an overhead obstacle impeding extraction of cured tread strip 2 from bottom shell 10a of curing mold 9 (i.e. an overhead obstacle with which the cured tread strip 2 underneath collides in the extraction area).

Secondly, curing station 7 described is cheap and easy to implement, by secondary roller 17 being cheap and easy to assemble (i.e. can be integrated in guide device 14 with no structural complications).

The invention claimed is:

1. A curing station for curing a tread strip, comprising:
   a flat curing mold;
   a gripper which grips a portion of the cured tread strip inside the curing mold;
   an actuating device which, at the end of the curing process, moves the gripper to gradually extract the cured tread strip from the curing mold; and
   a guide device which, as the cured tread strip is extracted, is positioned over the curing mold, and comprises a main roller, about which the extracted part of the cured tread strip winds;
   the curing station being characterized in that the guide device comprises a secondary roller smaller in diameter than, and positioned parallel to and alongside, the main roller.

2. A curing station as claimed in claim 1, wherein the secondary roller is located upstream from the main roller in the cured-tread strip extraction direction in which the actuating device moves the gripper.

3. A curing station as claimed in claim 1, wherein the guide device comprises two supporting brackets which are located on opposite sides of, and support for rotation, both the main and secondary rollers which are hinged to the supporting brackets.

4. A curing station as claimed in claim 3, wherein both the main and secondary rollers are fitted idly to the supporting brackets to rotate freely about respective axes of rotation perpendicular to the cured-tread strip extraction direction in which the actuating device moves the gripper.

5. A curing station as claimed in claim 3, wherein the two supporting brackets are fitted to a slide mounted on a guide, parallel to the cured-tread strip extraction direction, to run in the extraction direction.

6. A curing station as claimed in claim 5, wherein the slide is mounted idly on the guide to run freely in the extraction direction.

7. A curing station as claimed in claim 1, wherein the guide device comprises two locators located on opposite sides of the guide device to define the sides of a channel in which the extracted part of the cured tread strip is confined.

8. A curing station as claimed in claim 7, wherein:
- the guide device comprises two supporting brackets which are located on opposite sides of, and support for rotation, both the main and secondary rollers which are hinged to the supporting brackets; and
- each locator is fixed to a respective supporting bracket.

9. A curing station as claimed in claim 8, wherein each locator is hinged idly to a respective supporting bracket to rotate freely about an axis of rotation parallel to the axes of rotation of the main and secondary rollers.

10. A curing station as claimed in claim 1, wherein the diameter of the main roller is at least twice the diameter of the secondary roller.

* * * * *